Nov. 30, 1948.  J. B. ANDERSON  2,455,210
APPARATUS FOR DISSEMINATING WEATHER INFORMATION

Filed Dec. 23, 1947  5 Sheets-Sheet 1

Inventor
Joseph B. Anderson

By Adams + Bush
Attorneys

Nov. 30, 1948.   J. B. ANDERSON   2,455,210
APPARATUS FOR DISSEMINATING WEATHER INFORMATION
Filed Dec. 23, 1947   5 Sheets-Sheet 2
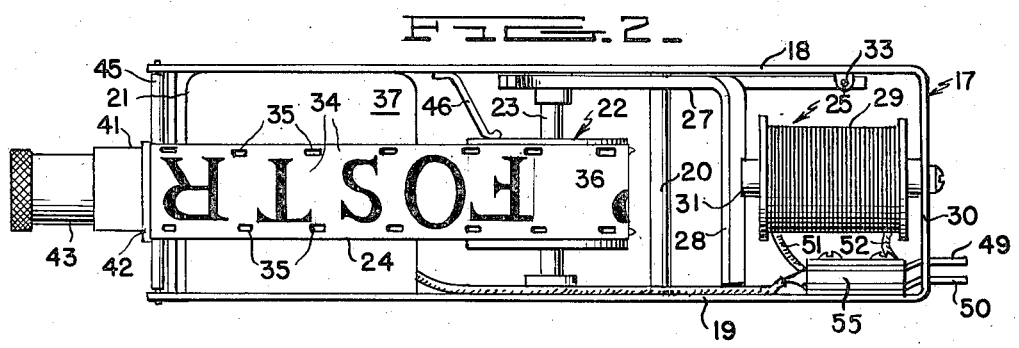
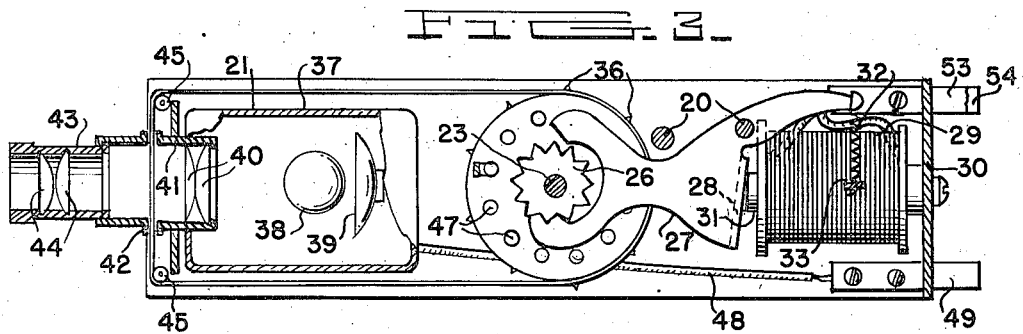
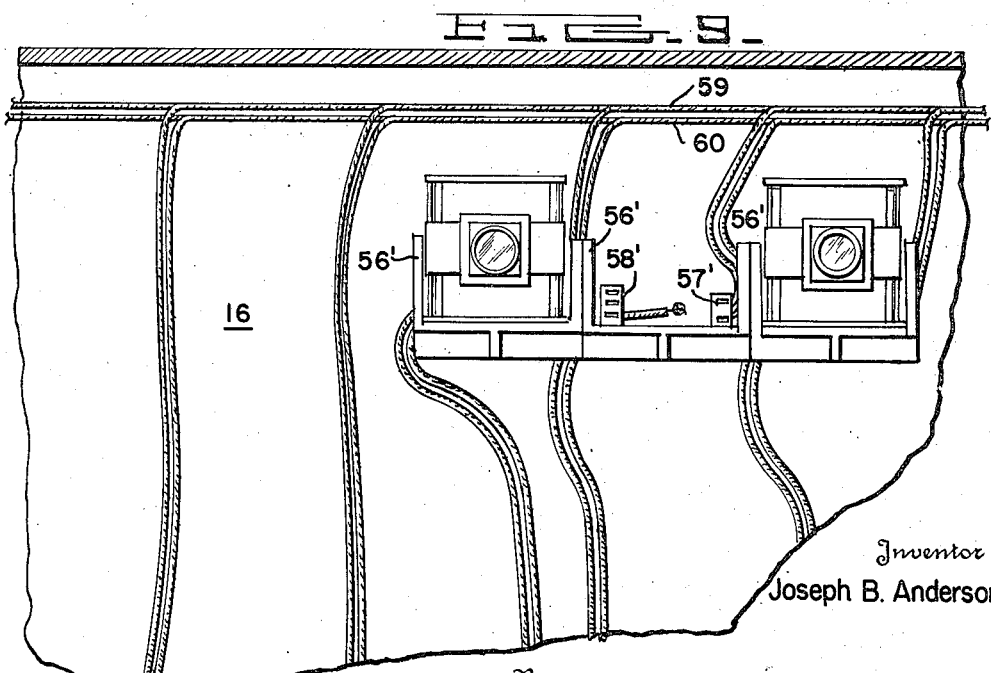
Inventor
Joseph B. Anderson
By Adams & Bush
Attorneys

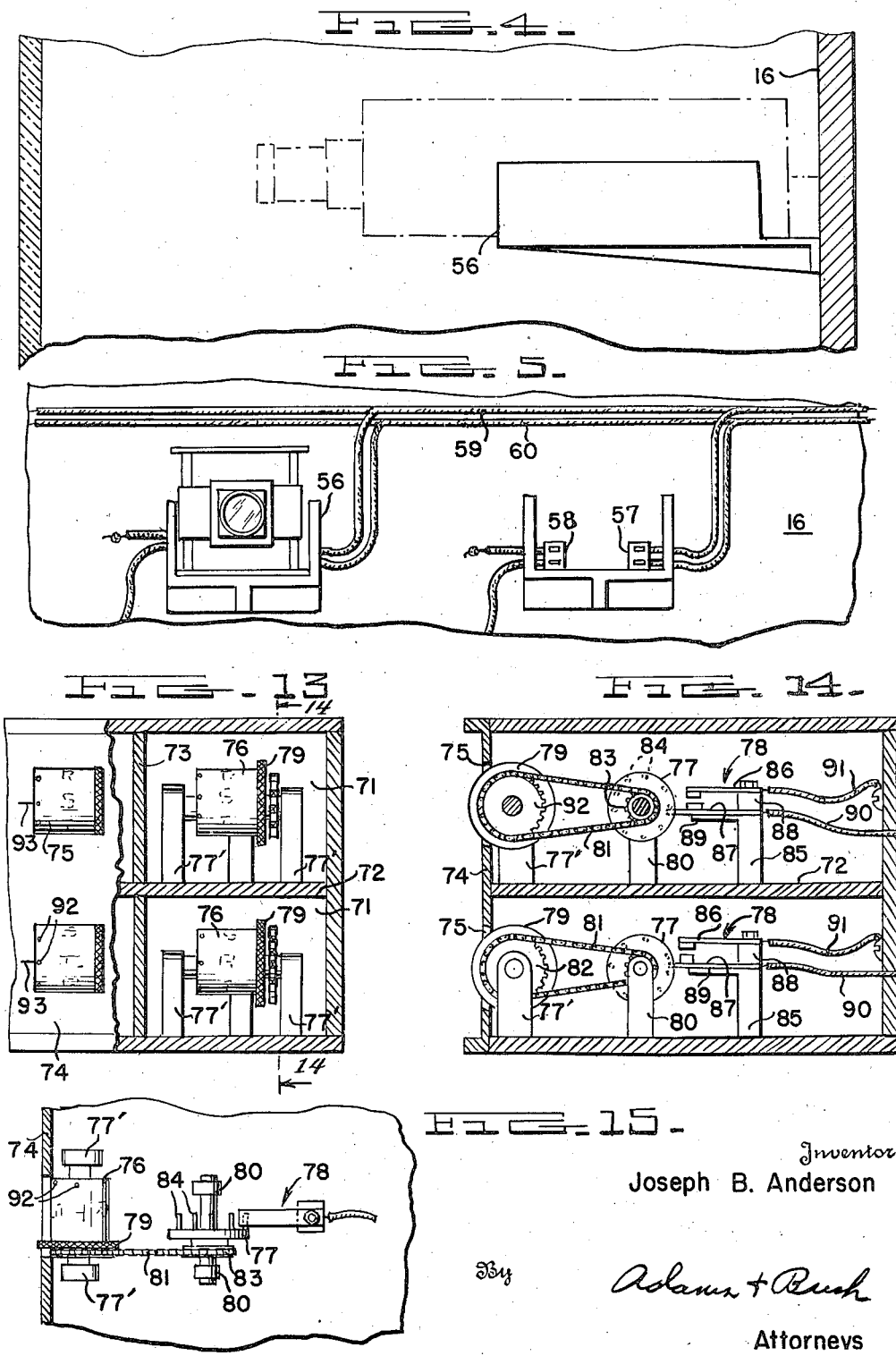

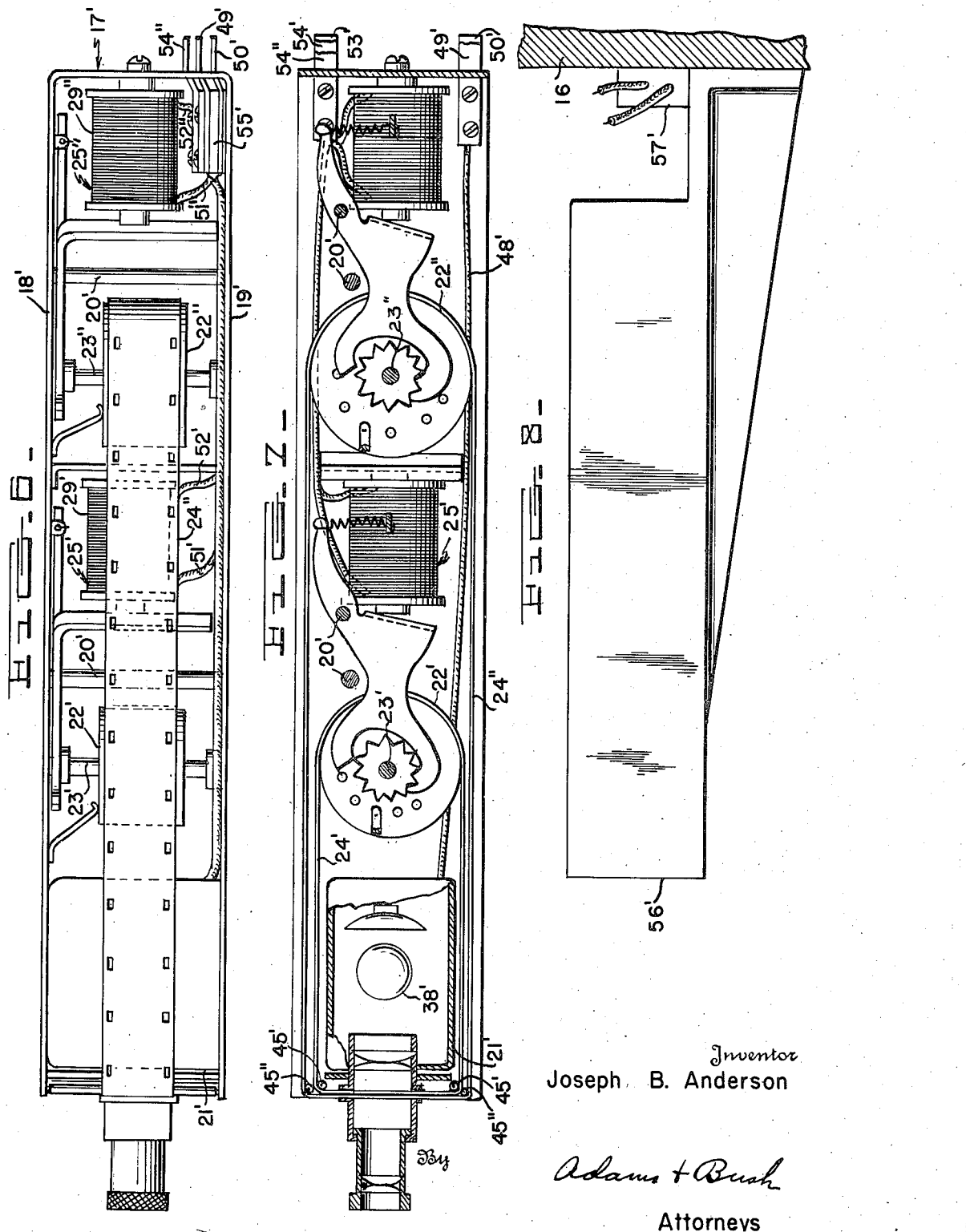

Nov. 30, 1948.    J. B. ANDERSON    2,455,210
APPARATUS FOR DISSEMINATING WEATHER INFORMATION
Filed Dec. 23, 1947    5 Sheets-Sheet 5
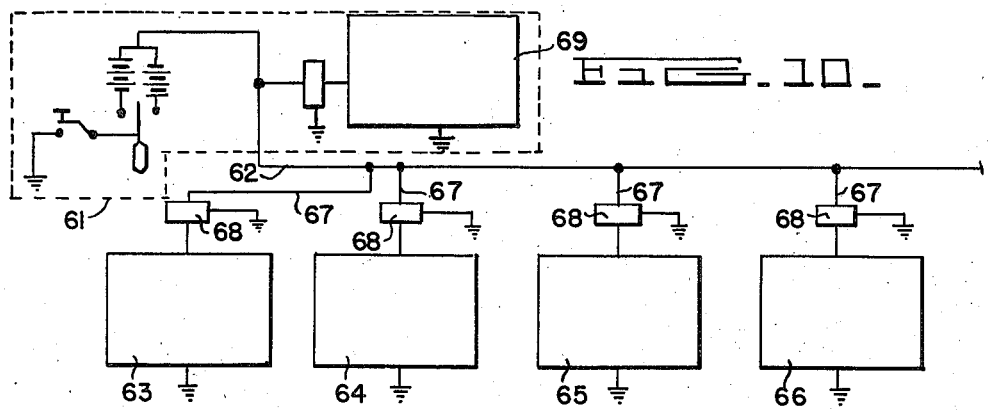
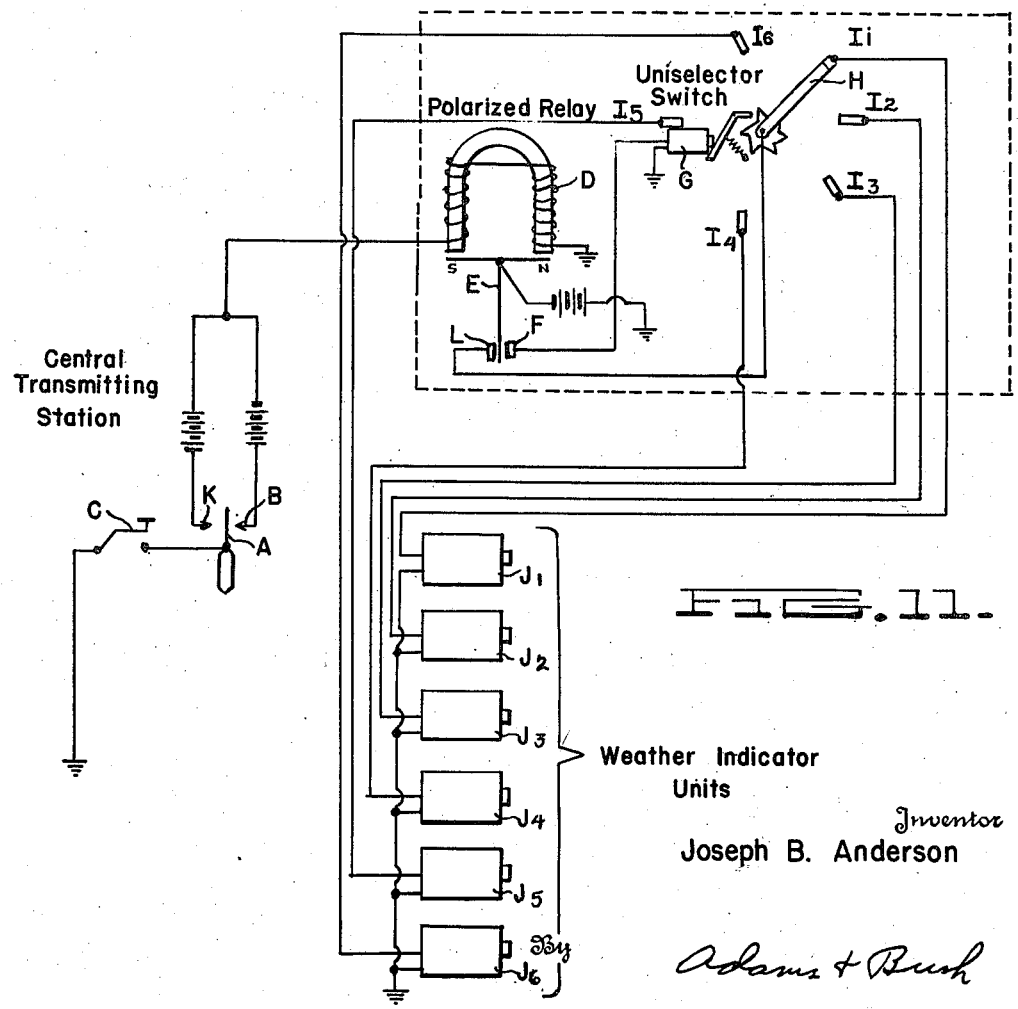
Joseph B. Anderson
Attorneys Patented Nov. 30, 1948

2,455,210

UNITED STATES PATENT OFFICE 2,455,210

APPARATUS FOR DISSEMINATING WEATHER INFORMATION

Joseph B. Anderson, Washington, D. C.

Application December 23, 1947, Serial No. 793,500

2 Claims. (Cl. 177—311)

This invention relates to weather maps and has more particular reference to weather maps incorporating visual indicating means for showing the present and/or future weather conditions at a plurality of stations on the map representing towns and cities.

One object of the present invention is to provide a weather map having a plurality of stations representing towns or cities outlined thereon and provided with means for visually indicating at each station the present or forecasted weather conditions of the station.

Another object of the present invention is to provide a weather map, as characterized above, in which the indicating means include movable members employing various colors, symbols and indicia to indicate specific weather conditions.

Another object of the invention is to provide a weather map, as characterized above, in which means are provided for illuminating the movable members to render them more readily visible.

Another object of the invention is to provide a weather map, as characterized above, in which the indicating means include a projector and the movable means are in the form of a film or films, the frames of which employ various colors, symbols and indicia used singly or in combination, to indicate specific weather conditions.

A further object of the invention is to provide a plurality of weather maps, as characterized above, in which the movable members are controlled and operated from a central control station.

A still further object of the invention is to provide a system for disseminating weather information at a plurality of remotely separated receiving stations which are controlled and operated by remote control from a central transmitting station.

Other objects and advantages of the invention will be apparent in the specification when considered with the accompanying drawings, wherein:

Fig. 2 is an elevational view of one form of an indicator unit;

Fig. 3 is a plan view, with parts broken away, of the indicator unit shown in Fig. 2;

Fig. 4 is a fragmentary vertical sectional view showing the manner in which the indicator unit shown in Fig. 2, is mounted;

Fig. 5 is a fragmentary elevational view showing a portion of the interior of the cabinet and the manner in which the indicator unit shown in Fig. 2, is mounted;

Fig. 6 is an elevational view of a modified form of an indicator unit;

Fig. 7 is a plan view with parts broken away, of the indicator unit shown in Fig. 6;

Fig. 8 is a fragmentary view showing a bracket on which the indicator unit shown in Fig. 6, is adapted to be mounted;

Fig. 9 is a fragmentary elevational view showing a portion of the interior of the cabinet and the manner in which the indicator unit shown in Fig. 6, is mounted;

Fig. 10 is a schematic diagram showing a system for operating a plurality of weather maps from a single transmitting station;

Fig. 11 is a schematic diagram showing the electric wiring for operating the weather map by remote control;

Fig. 13 is a fragmentary elevational view with parts broken away to show the interior of the control box shown in Fig. 12;

Fig. 14 is a vertical sectional view taken on the line 14—14 of Fig. 13; and

Fig. 15 is a fragmentary plan view showing one of the control devices shown in Fig. 14.

The present invention constitutes an improvement over the weather map disclosed in my copending application, Ser. No. 750,617, filed May 26, 1947, for Weather map.

In the present invention, the translucent panel on which the map is outlined and the cabinet in which it is mounted may be similar to that shown in the aforesaid application. However, the mechanism for indicating weather conditions at the various stations on the map comprises novel and greatly improved means for showing a far larger number of specific weather conditions.

In general, the present invention comprises the use of indicator units employing projectors, using film having various colors, symbols, numerals and other indicia to indicate specific weather conditions, to project visual images on the stations outlined on the map to indicate specific weather conditions, present or future, existing at the respective stations. Preferably, the indicator units are operated electrically.

The present invention further comprises the use of a plurality of weather maps employing electrically operated indicator units which may be controlled from a remotely located central transmitting station. In such a system, the central control station may be located, for example, in New York city, for singly or simultaneously controlling and operating the indicator units on weather maps located, for example, in Baltimore, Philadelphia, Washington, D. C., etc.

Figure 1:
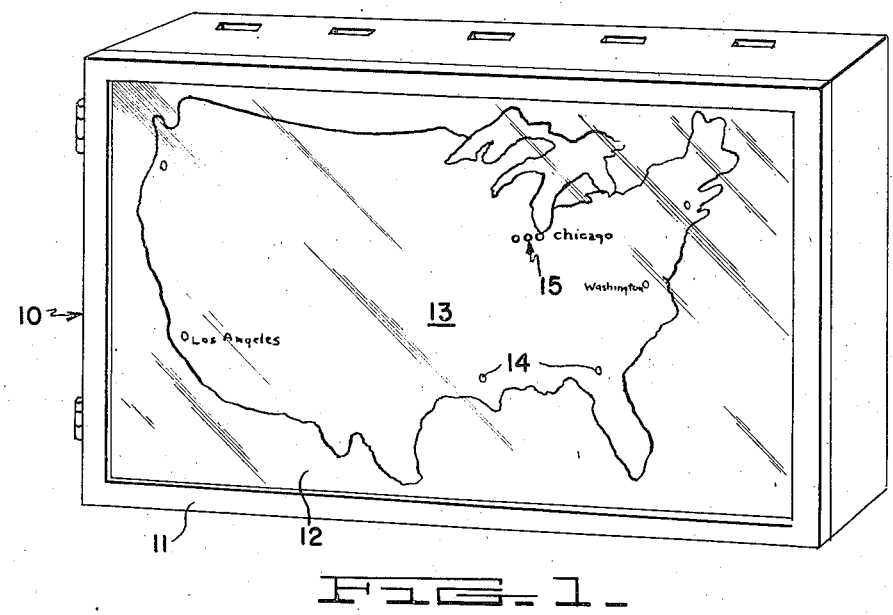
Fig. 1 is a perspective view of a weather map constructed in accordance with the present invention.
Figure 12:
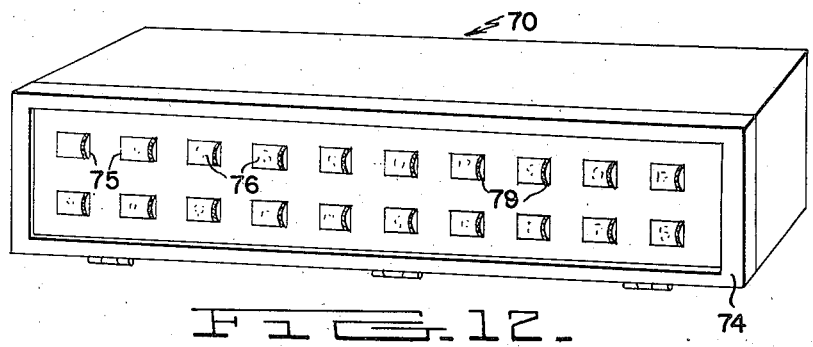
Fig. 12 is a perspective view of a control box for operating the weather map.

Referring now to the drawings, there is shown in Fig. 1, a weather map constructed in accordance with the present invention and shown in the form of a rectangular cabinet member 10. The front of the cabinet has hingedly secured thereto a map frame 11, in which is suitably mounted a plate or panel member 12, on which is sketched, painted, or printed, a map 13 of a country or section thereof. The location of various towns and cities that transmit weather reports may be indicated by circles 14 with the name of the places indicated in close proximity to the circles. The plate 12 may be either translucent or opaque; in the latter event, the areas enclosed within the circles 14 are made translucent. In the particular embodiment shown, the plate 12 is preferably made of a translucent plastic material.

Mounted within the cabinet 10 and preferably on the rear wall thereof, are a plurality of indicator units. These indicator units may be of two types, i. e., a single film indicator unit or a multiple film indicator unit. A single film indicator is used to show the ordinary weather conditions at a station, while one or more multiple indicator units may be used to show numerous other weather conditions, particularly useful for aviation, such as ceiling, wind direction and velocity, visibility in yards, etc., in combination with various other weather conditions, such as rain, snow, etc.

The indicator units are mounted on the rear wall of the cabinet in a position in horizontal alignment with their corresponding station circles. When multiple film types of indicator units are employed, one or more circles are used for a single station, as shown, for example at 15, in Fig. 1, where Chicago employs three circles.

A preferred form of single film indicator unit and the manner in which it is mounted on the rear wall 16 of the cabinet is shown in Figs. 2, 3, 4 and 5. As there shown, each unit comprises a U-shaped frame member 17 having top and bottom walls 18, 19 held spaced apart by posts 20; a projection unit 21 mounted within and adjacent to the open end of the frame member and suitably secured therein; a rotatable drum 22 mounted on a vertical shaft 23 suitably journalled in the top and bottom walls of the U-shaped frame; a film 24 mounted on the drum 22 and positioned to pass through the projector unit; and an electro-magnetically operated unit, indicated generally at 25, for rotating the drum 22. The electro-magnetically operated unit for rotating the drum 22 comprises a ratchet wheel 26 fixedly mounted on the shaft 23 and operated by an operating fork 27, suitably mounted on one of the posts 20 and provided with a right angular armature portion 28; and an electro-magnet 29 suitably secured to the end wall 30 of the frame 17 and provided with a core 31 cooperating with the armature portion 28 of the fork 27. When the magnet is energized, the operating fork 27 will be moved to turn the ratchet wheel 26, and, upon de-energization of the magnet, the operating fork will be restored to its normal position by means of a spring 32 which is secured to the operating fork and a lug 33 depending from the top of the frame; the construction being such that the movements of the fork by the energization of the magnet and the spring 32 will rotate the weather ring with a step by step motion.

The weather film 24 may be made of plastic or any of the usual materials employed in making a film for color projection and is divided into a plurality of picture areas or frames 34 which may be colored or uncolored and carry indicia to indicate a particular state of weather, temperature, ceiling, wind direction and velocity, or any other weather information.

In the particular embodiment shown in Figs. 2 and 3, the weather film is divided into twenty-five rectangular picture areas or frames. One of the frames is made opaque, the remaining frames are colored and may be provided with certain letters, symbols, or numbers, each of which is appropriate to describe a specific weather condition, such as rain, snow, frost, temperature, wind direction and velocity, etc. For example, a red colored frame with an R may indicate rain; a red colored frame with a T may indicate thunder storms; and a green colored frame without a symbol may indicate fair, clear weather. The film 24 preferably has a longitudinal row of perforations 35 extending on one or both longitudinal edges adapted to engage sprockets 36 formed on one or both ends of the drum 22 in order that the position and rate of motion of the film may be accurately determined by the rotation of the drum 22.

In the particular embodiment shown, the projection unit 21 may be of the usual type employed for projecting on the rear of a screen. The projection unit comprises a lamp housing 37 secured to the top and bottom walls 18, 19 of the U-shaped frame member; a lamp 38 and reflector 39 mounted within the housing; condensing lenses 40 mounted in a tubular lens holder 41 having a rectangular film holder 42 extending transversely thereof and open at both ends for the passage of the film; an adjustable objective lens holder 43 telescopically mounted in the outer end of the tubular lens holder 41, and objective lenses 44 mounted within the objective lens holder 43. To facilitate the movement of the film through the film holder 42, a pair of vertical idle rollers 45 are mounted within the frame and positioned opposite the entrance and exit to the film holder, as best seen in Fig. 3.

The construction of the film, with its several picture areas or frames, the drum with its sprockets engaging the perforations in the film, and the electro-magnetic means for rotating the drum and thereby the film, is such that the movements of the fork by the energization of the magnet and the spring 32, will rotate the drum and the film to position the next picture area or frame for projection. While any suitable type of pawl and ratchet construction may be employed to rotate the drum, preferably, and as shown, a pawl and ratchet construction such as is disclosed in U. S. Patent No. 1,979,028, issued on October 30, 1934, to J. B. Ewart, for Pawl and ratchet mechanism, is used. The drum is held in position after each such movement and rotation in the opposite direction is prevented by means of a pawl 46 suitably secured to the top of the U-shaped frame and having its depending end cooperating with circular depressions 47 formed in a circular series in the top of the drum, as shown in Figs. 2 and 3, the number of holes 47 being equal to twice the number of teeth on the ratchet wheel.

The electrical connections 48 from the lamp 38 terminate in slip connections 49, 50 and the electrical connections 51, 52 of the winding on the electro-magnet 29 terminate in slip connections 53, 54, with insulating members 55 positioned between the slip connections, all for a purpose hereinafter to be described.

Means are provided for mounting the indicator units on the inner surface of the rear wall of the cabinet so that each indicator will be positioned behind a corresponding station circle, with the projector in horizontal alignment with the station circle.

In the particular embodiment illustrated, as shown in Figs. 4 and 5, each indicator unit is mounted on the inner face of the rear wall 16 of the cabinet by means of a channel-shaped supporting bracket or member 56, suitably secured to the rear wall of the cabinet, as by welding. An insulated female contact member 57 is secured to the rear end of the bracket for engagement with the lamp slip connections 49 and 50, and an insulated female contact member 58 is secured to the rear end of the bracket for engagement with the electro-magnet winding slip connections 53 and 54. The wires from the lamp female contact members 57 are connected in parallel to wires 59 and 60, which are connected to a source of electric current (not shown). One of the wires from each of the female contact members 58 are led from the bottom of the cabinet and are preferably connected to a suitable selector mechanism (not shown), while the other of the wires is grounded to the board.

With the above described mounting construction, each of the indicator units may readily be slid into or out of its channel-shaped supporting bracket independently of the others, to facilitate inspection, repair or replacement.

The multiple film type of indicator units and the manner in which they are mounted in the cabinet, are shown in Figs. 6, 7, 8 and 9. These units are similar in construction to the single film type indicators, with the exception that they employ two or more films and, necessarily, a corresponding number of drums and operating mechanisms therefor. In the particular embodiment illustrated, a multiple film type employing two films is shown. As there shown, each such unit comprises a U-shaped frame member 17′ having top and bottom walls 18′, 19′ held spaced apart by posts 20′; a projector unit 21′ mounted with and adjacent to the open end of the frame member; a rotatable drum 22′ mounted on a vertical shaft 23′ suitably journalled in the top and bottom walls of the U-shaped frame; a film 24′ mounted on the drum 22′ and positioned to pass through the projector unit; an electro-magnetically operated unit, indicated generally at 25′, for rotating the drum 22′; a second rotatable drum 22″ mounted on a vertical shaft 23″ suitably journalled in the top and bottom walls of the frame member and spaced from the operating unit 25′; a second film 24″ mounted on the drum 22″ and positioned to pass through the projector unit in a superposed position with relation to film 24′; and a second electro-magnetically operated unit, indicated generally at 25″ for rotating the drum 22″.

The electro-magnetically operated units 25′ and 25″ for rotating the drums 22′ and 22″, respectively, are identical in construction and operation to the electro-magnetically operated unit 25 for operating the drum 22. The weather films 24′ and 24″ are identical in construction to the weather film 24, except that the film 24″ is of greater length. The films 24′ and 24″ are divided into a plurality of picture areas or frames which are so colored and marked as to provide for the showing of a greater number of weather conditions than can be shown with a single film type of projector. For example, the inner film 24′ may consist solely of colored picture areas or frames without indicia, while the outer film 24″ may employ numbers, symbols, etc., which, when projected in combination with a particular picture area of film 24′, produce a projected picture of a color and indicia combination to indicate a particular type of weather showing ceiling, direction of wind and velocity, visibility, etc.

The projection unit 21′ is identical in construction to the projection unit 20, except that two pairs of idle rollers 45′ and 45″ are employed, the outer pair 45″ being engaged by the outer film 24″ and the inner pair 45′ being engaged by the inner film 24′.

The electrical connections 48′ from the lamp 38′ terminate in slip connections 49′, 50′, for the same purpose as do the electrical connections from the lamp 38. The electrical connections 51′ and 51″ of the windings on the electro-magnets 29′ and 29″ terminate in ground slip connection 53′; the electrical connection 52′ of the windings on magnet 29′ terminates in slip connection 54′, while the electrical connection 52″ of the windings on magnet 29″ terminates in slip connection 54″.

The multiple film type of indicator unit is mounted in a channel-shaped supporting member 56′, identical in construction to the supporting member 56, except that the supporting member 56′ is longer.

An insulated female contact member 57′ is secured to the rear end of the bracket 56′ for engagement with the lamp slip connections 49′ and 50′. An insulated female contact member 58′ is secured to the rear end of the bracket 56′ for engagement with the electro-magnet winding slip connections 53′, 54′ and 54″. The wires from the lamp contact member 57′ are connected in parallel to the wires 59 and 60. The ground wire from the contact member 58′ is grounded to the back of the cabinet, while the other two wires from the contact member 58′ are led from the bottom of the cabinet and are preferably connected to a suitable selector mechanism (not shown).

While the electro-magnetically operated weather indicators may be individually operated by remote control, or by local control, in a manner hereinafter to be described, it is further contemplated, as a part of this invention, that a plurality of weather maps be simultaneously operated by remote control from a central transmitting station. Such an arrangement is shown diagrammatically in Fig. 10. As there shown, a central transmitting station 61, located, for example, in New York city, sends electrical impulses over a communication channel, such as transmission line 62. Weather maps 63, 64, 65 and 66, located, for example, in Philadelphia, Baltimore, Washington and Richmond, are connected to the line 62 by drop lines 67. Each of the drop lines 67 is connected to a selector box 68, which may include one or more well known selector mechanisms, to which are connected the circuits from each of the weather indicator units on the particular map controlled by the selector. The system is such that an operator at the central control station may simultaneously operate the corresponding station indicator units on each of the weather maps 63, 64, 65 and 66. A weather map 69 is located at the central transmitting station so that the operator may check upon the positions of the indicator units at the various stations.

A simple type of selector box and the electrical connections therefor, including the operation thereof from the central control station, is schematically shown in Fig. 11. As there shown, the selector box includes a polarized relay and a uniselector switch; the polarized relay is connected to the transmission line from the central transmitting station and the uniselector switch is connected to each of the weather indicator units on the weather map.

In operation, the operator at the central transmitting station throws the switch A to engage right hand contact B which, upon the closure of switch C, will permit the flow of current through the field coil D of the relay in a direction to cause the armature E to be swung to the right to engage contact F, thereby closing the circuit through the electro-magnet G, which through the pawl and ratchet, moves contact arm H of the selector switch to the succeeding stationary contacts $I_1$, $I_2$, $I_3$, etc., which are connected to weather indicator units $J_1$, $J_2$, $J_3$, etc., respectively.

When the proper stationary contact $I_1$, $I_2$, etc., has been selected, i. e., the one connected to the weather indicator unit desired to be changed, the operator at the central transmitting station moves the switch A to engage the left hand contact K, which, upon closure of switch C, will permit the flow of current through the field coil D in a reverse direction, thereby causing the armature E to be swung to the left to engage contact L, thereby closing the circuit through the selector contact arm H, the selected stationary contact, either $I_1$, $I_2$, $I_3$, etc., and through the electro-magnet of the selected weather indicator unit $J_1$, $J_2$, $J_3$, etc., to cause said unit to rotate the drum which it operates to advance the film on the drum to bring another weather picture area into position in the projector to be projected onto the map. Obviously, each closure of switch C by the operator will operate the selected indicator unit to cause the film controlled thereby to be advanced to bring the succeeding weather picture frame in proper position to be projected onto the map.

A preferred form of apparatus for operating a weather map locally is shown in Figs. 12, 13, 14 and 15. As there shown, the control and operating apparatus is housed in a rectangular cabinet member 70. The interior of the cabinet is divided into a plurality of rectangular compartments 71 by means of a longitudinally extending partition member 72 and a plurality of vertical partition members 73. The front of the cabinet is closed by a hingedly mounted cover member 74. The cover member 74 is provided with a plurality of rectangular openings 75, one for each of the compartments into which the cabinet is divided.

Mounted within each of the compartments 71 is a control apparatus for operating a weather indicator unit on the weather map. Each of the control apparatuses is identical in construction and comprises a control drum 76; an electrical contact making disc 77; and an electrical switch 78. The control drum 76 is journalled in support members 77' suitably secured to the bottom of the compartment and positioned so that, as the drum rotates about its longitudinal axis, a portion of the drum extends through the opening 75 in the front cover member 74. A knurled collar 79 is fixedly mounted on one end of the control drum in position to have a portion extend through the opening 75 so that the knurled collar may be turned to rotate the control drum, all as shown in Figs. 13, 14 and 15.

The contact making disc 77 is journalled in support members 80 and is driven by the control drum by means of a sprocket chain 81 which engages a sprocket 82 formed on the end of the control drum adjacent to the knurled collar and a sprocket wheel 83 fixedly mounted on the contact disc shaft. The contact disc is provided with a circular series of projections 84 adjacent to its outer periphery.

The electrical switch 78 comprises a support member 85 on which are suitably mounted a pair of contact members 86, 87, superimposed one on the other and spaced apart by an insulating member 88. The bottom contact member 87 is made of resilient material, such as a strip of spring metal, and its outer free end is positioned to be engaged in succession by the projections 84 of the contact disc, as the disc is rotated. A strip of stiff insulating material 89 is secured to the support member 85 and engages the under surface of the bottom contact member 87, as shown in Fig. 14. The stiff insulating strip 89 is of less length than the superimposed contact member 87 and acts as a dampener to prevent the contact member from vibrating after it has been engaged and released by one of the projections 84 of the contact disc.

The bottom contact member 87 is connected to a wire 90 which, in turn, is connected to the wire leading from one of the weather indicator units, while the top contact member 86 is grounded by means of wire 91 to complete the circuit through the electro-magnet of the weather indicator unit controlled by the particular contact apparatus.

The circumference of the control drum is divided into a plurality of marking areas, one for each of the picture areas on the film of the weather indicator unit which the drum controls. Each of these marking areas has a reference mark 92 and carries indicia corresponding to the indicia of the corresponding picture area of the film. On the front cover member 74, at one side of each of the rectangular openings 75 is a reference mark 93. The number and spacing of the projections 84 on the contact disc are such that, when the reference mark 92 on the control drum is aligned with the reference mark 93 on the cover member 74, the particular type of weather indicated by the marking area aligned with the reference mark 92 will be projected on the map by the particular weather indicator unit controlled by the control drum. As the knurled collar is turned, the contact disc is rotated and the projections 84 engage the lower contact member 87, sending impulses to the weather indicator unit to rotate its film to advance the picture areas or frame into position to be projected on the map.

It is contemplated that the control cabinet 70 be located in the rear of the weather map. However, it may be located in a separate room or at any distance from the map desired.

From the foregoing, it will be seen that there has been provided a weather map having weather indicator units adapted to show a large number of specific weather conditions, and which, when grouped in groups of two or more, are capable of indicating any and all types of weather conditions, including visibility, ceiling, and wind direction and velocity. It is contemplated that when the map is used exclusively for aviation purposes, that each city be provided with two or more multiple film type weather indicators; but, when used for displaying weather conditions to the general public, or as a cynoshure for advertising media, that single film types of indicators be employed.

It is further contemplated that for some purposes it may be desirable to construct some of these maps without the condensing and objective lenses shown in Figs. 2, 3, 6 and 7, and that the picture areas or frames on the films be projected onto the basic map 12 by means of the light bulb and reflector alone, in a manner similar to that employed in my aforesaid co-pending application.

Obviously, the invention is not restricted to the particular embodiments thereof herein shown and described. Moreover, it is not indispensible that all of the features of the invention be used conjointly, since they may be employed advantageously in combinations and sub-combinations.

Having thus described the invention, what is claimed is:

1. A weather map comprising a panel member having a map associated therewith, said panel member having a plurality of translucent areas thereon each designating a particular locality on the map; a plurality of weather indicating units mounted behind said panel, each of said units being positioned under one of said areas designating a particular locality, each of said units including a projector and two endless films each divided into a plurality of frames and so positioned that their frames when in position to be projected are superimposed, the frames of one of said films being colored, each frame of different coloring and the frames of the other film having different indicia formed thereon, the construction being such that the projected combined image of any one of the colored frames with any one of the indicia carrying frames designates a particular weather condition; each of said projectors being mounted in the rear of said panel in a position to permit the combined image of a superimposed pair of frames to be projected onto one of said translucent areas, whereby said projected image may be seen from the front of said panel; and separate means for moving each of said films in each of said indicator units to bring any selected pair of frames into superimposed position to have their combined images projected to show a particular weather condition of the particular area aligned with the projector.

2. A weather map as set forth in claim 1, wherein each of said separate means for moving the films comprises a step by step electromagnet operating mechanism adapted to be controlled and operated from a remote control station.

JOSEPH B. ANDERSON.

REFERENCES CITED

The following references are of record in the file of this patent:

UNITED STATES PATENTS

| Number | Name | Date |
|---|---|---|
| 386,189 | Delany | July 17, 1888 |
| 655,264 | Nichol | Aug. 7, 1900 |
| 1,129,693 | Kurre | Feb. 23, 1915 |
| 1,580,286 | Cloud | Apr. 13, 1926 |
| 1,958,208 | Scheidegger | May 8, 1934 |
| 1,960,781 | Hershey | May 29, 1934 |
| 2,074,066 | Wheeler et al. | Mar. 16, 1937 |
| 2,417,043 | Blewett et al. | Mar. 11, 1947 |